March 7, 1967 C. L. BLACKLEY ETAL 3,308,451
WEB RECORD MEMBERS
Filed Dec. 19, 1963 2 Sheets-Sheet 1

INVENTORS
CHARLES L. BLACKLEY
HERBERT E. THOMPSON
By Fraser and Bogucki
ATTORNEYS March 7, 1967 C. L. BLACKLEY ETAL 3,308,451

WEB RECORD MEMBERS

Filed Dec. 19, 1963 2 Sheets-Sheet 2

United States Patent Office 3,308,451

Patented Mar. 7, 1967

3,308,451

WEB RECORD MEMBERS

Charles L. Blackley, Los Gatos, and Herbert E. Thompson, San Jose, Calif., assignors to International Business Machines Corporation, New York, N.Y., a corporation of New York Filed Dec. 19, 1963, Ser. No. 331,774
14 Claims. (Cl. 340—174.1)

This invention relates to data processing systems and more particularly to web record members for such systems, which members are required to be dimensionally and dynamically stable during movement in a curvilinear path.

Magnetic tapes, sheets, cards and the like are used in many data processing systems for the storage of data. In a typical system, magnetic tape is driven past recording or reproducing transducers (magnetic heads) by a transport mechanism, the tape usually being restrained within a well defined path. Because of cost, reliability and other factors, magnetic storage elements are used more frequently than any other types of record members, although many other record members are employed for various applications, including certain thermoplastic photographic and electrostatic webs, sheets and other elements.

In a typical data processing system application, the magnetic record member, such as tape, follows a curvilinear path in passing through the guide mechanisms, the magnetic recording or reproducing head assembly, and the appropriate buffer mechanisms, such as vacuum chambers, of the system. It has been found that when the record member moves in a curved path, it does not remain flat along its transverse direction, but tends to curve or curl at its edges because the longitudinal tension created by the curvature introduces lateral contraction or expansion. The record member is a planar body having a finite thickness, and when it is bent about a central axis normal to given side edges of the plane of the body, the outer surface of the body stretches, while the inner surface of the body compresses relative to the transverse midplane of the body. This disparity in tensile and compressive forces along the arc followed by the body leads to the observed lateral contraction or expansion of the body. The ultimate result is that the curved outer edges of the body bend outwardly, i.e. curl upwardly away from the transverse midplane of the body, in a direction opposite the direction of bend of the body as a whole, to exhibit what is known as anticlastic curvature.

The problem of anticlastic curvature is not appreciable with most tape systems, because the tape may be held under constant tension about a rotary member, and usually is not subjected to wearing contact while under curvature. Where anticlastic curvature of the tape has introduced potential tape wear problems, the system has usually been designed to avoid use of the outer edges of the tape for recording and reproducing and thus avoid wear of the tape by contact with the magnetic head. Alternatively, certain of such systems simply accept the additional edge wear and the reduced life of the tape. Avoidance of use of a portion of the tape, of course, means that there is a proportional reduction in the data capacity of the tape.

Such approaches cannot be effectively used in modern high density random access memory systems, since these systems utilize relatively short lengths of magnetic strips, sheets or cards as record members for internal storage. Wear of these record members must be kept substantially uniformly low, and as much of their surface area must be used as possible, in order to maximize the capacity of the memory system. Because the record members are only intermittently withdrawn from storage by an appropriate selector mechanism, they cannot be held under positive tension in the same manner as a magnetic tape is held with a conventional tape transport mechanism Accordingly, the record members should be configured so as to have the requisite stability under dynamic conditions in order to optimize the memory system.

As an example, one such random access memory system employs a number of flexible magnetic record members in the form of sheets which are maintained in storage in separate cells. Each sheet provides storage surface for a number of parallel data tracks, to which access my be had from a single read-write station having a selector, withdrawal and return assembly. To gain access to a particular sheet, a separator arm mechanism exposes that sheet within its cell, whereupon the sheet is gripped at its leading edge and is withdrawn outwardly towards the read-write station and onto a rotatable drum. The drum is driven in a selected direction at high speed so that the sheet is moved past a multi-head assembly (read-write station) which extends transversely across the sheet in close association therewith. The multi-head assembly is moved laterally relative to the sheet so as to be associated with individual groups of tracks laterally disposed across the sheet. It is highly desirable that as much as possible of the sheet be utilized for data storage in order to maximize data capacity. The spacing between the sheet from the head assembly should be kept constant and very small, so as to avoid wearing of both the sheet and the head assembly, while still permitting high signal playback levels and low noise.

When the record member is gripped only at its leading edge a film of air is passed on both sides so as to leave minute but finite spacings between the record member and head assembly and between the record member and the rotatable drum. The record member thus represents the classic case of an elastic member acted upon by bending forces in such a manner as to create anticlastic curvature. The side edges of the sheet on the drum tend to curl or curve upwardly into contact with the head assembly, and this "cupping" effect is accentuated because the sheet is pulled along from its leading edge. Substantial wear of the edges of the sheet, or of the magnetic heads, may occur by contact with the head assembly. Even if the record member is held in contact with the drum, as by a vacuum holddown mechanism, the forces and curvature are present.

It is, therefore, an object of the present invention to provide an improved record member for data processing systems.

It is another object of the present invention to provide an improved magnetic record member for data processing systems, which record member is substantially free of dimensional distortion due to anticlastic curvature when moving in a curvilinear path.

Magnetic record members in accordance with the present invention minimize anticlastic curvature by incorporating a profile having relieved portions which compensate for the forces responsible for the anticlastic curvature. Thus, the thickness of the record member may be controlled by chamfering the side edges of the member in a selected fashion.

As an example, a magnetic record member for a random access memory is formed from a generally rectangular record sheet comprising a partially flexible plastic substrate having a magnetic coating on its recording surface and an anti-static carbon coating on the opposite surface. The sheet is chamfered, in accordance with the invention, on the long (side) edges through the carbon coating on the sheet. These edges are cut back or beveled by removing a segment of triangular cross section along the edge to form straight chamfers having a relatively small angle relative to the plane of the sheet. As a preferred example, each chamfer has an angle of approximately 1° to 2° and is provided with an extremely smooth surface.

In another example of a record member in accordance with the invention, the transverse disposition of the record member can be further linearized. To this end longitudinal indentations may be introduced in the record member at points spaced inwardly from the chamfered edges. Such indentations provide additional radial forces which compensate for the bending moments in such fashion and at such points as to flatten out the surface of the record member.

The foregoing and other objects, features and advantages of the invention will be apparent from the following more particular description of preferred embodiments of the invention, as illustrated in the accompanying drawings.

Figure 1:
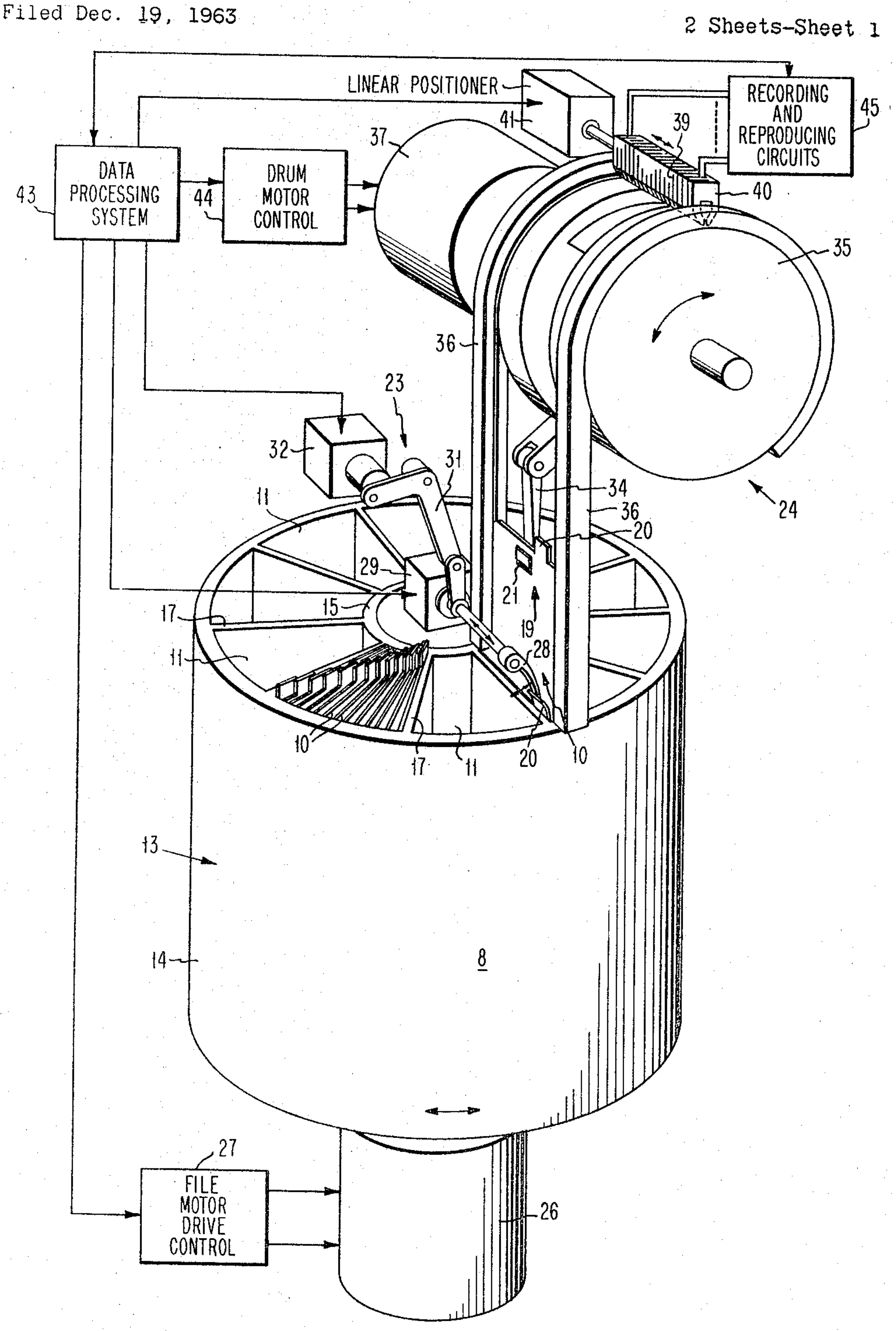
FIG. 1 is a schematic perspective view, partially broken away, of one exemplification of a portion of a random access memory system employing record members in accordance with the invention.

Referring now more particularly to FIG. 1, one example of a portion of a random access memory system 8 is illustrated, in which system 8 an improved record member in accordance with the invention can be effectively utilized. This exemplary memory system, exclusive of the record member, does not form a part of the invention and, moreover, its components are now known in the art. Accordingly, only a brief description of this system is set forth hereinafter. The system 8 has an extremely high storage capacity, e.g. billions of binary digits, and relatively high speed access times (a few hundredths of a millisecond). In this system, a plurality of record members 10, only a few of which are shown, are disposed in cells 11 along the radii of an open ended cylinder 13 defined by an outer protective shell 14, an inner concentric shell 15, and radial partitions 17 defining the cells 11. A selected number of the record members 10 are disposed within each of the cells 11 with the uppermost ends of each of the record members 10 having appropriate indexing and gripping means 19 for withdrawal of the record members 10 from the cells 11. As an example, the means 19 may comprise, as more fully shown in FIG. 2, an upwardly extending index tab 20 and an aperture 21 which may be, for example, rectangular.

When access to a specific record member 10 is desired, a separator mechanism 23 associated with the transport and read-write eassembly, generally designated 24, is positioned at the desired cell 11. The system actually shown in FIG. 1 moves the cylinder 13 itself while holding the remainder of the system stationary. A motor 26 actuated by a file motor drive control 27 is actuated to rotate the cylinder 13 so that the stationary separator mechanism 23 can act on the record members on each side of the selected record member 10. Thus, when a selected record member has been moved to the access position by rotation of the cylinder 13 under control of the motor 26 and the drive control 27, the separator mechanism 23 is actuated. Separator arms 28 are radially moved (relative to the cylinder 13) by linear positioners 29 (only one arm 28 and positioner 29 being shown in FIG. 1). These radial positions correspond to the index tabs 20 of the record members on each side of the selected record member 10. The separator arms 29 are then moved downwardly to engage the index tabs 20, and outwardly from the selected record member 10 so as to push the undesired record members 10 away from the chosen record member and leave it exposed for withdrawal.

To this end, the linear positioner assembly 29 and associated arm 28 are first moved vertically downwardly on a linkage mechanism 31 rotated by a motor 32 or solenoid device, so that the separator arm 28 is between the index tabs 20 of the chosen and adjacent record member. As the motor then continues to rotate the linkage mechanism the linear positioner 29 engages a stop (not shown) and the separator arm 28 is rotated away from the chosen record member 10. Many other means for selection and separation may be used, so that the means shown must be considered as one example only.

An engagement arm 34 is then inserted into the aperture 21 adjacent the upper edge of the desired record member, and withdraws this record member 10 from the cell 11 onto a rotatable drum 35 supported above the cylinder 13, along guides 36 extending from the shells 14 and 15.

Rotation of the drum 35 is effected by a high speed bidirectional drum motor 37 and is carried out at extremely high speed, so that the selected record member 10 rapidly rotates with the drum 35 and, in so doing, passes a head assembly 39 (forming part of the transport and read-write assembly 24) which extends transversely across the path of the record member. The head assembly 39 includes a number of magnetic heads 40, disposed laterally across the width of the record member 10, and movable, as by a linear positioner 41, to any one of a number of transverse positions, so that any one or more record tracks on the record member may be selected, as desired. Signal and data recording or reproduction may then be effected, as desired, for a particular data processing operation of the associated system.

When the desired usage of the record member 10 has been completed, the drum 35 is immediately reversed and the record member is guided back down into its slot by the arm 34 and mechanism 24 into the proper cell 11. The operation may then be repeated, as desired, with a record member 10 from the same cell 11 or with a member from a different cell 11.

The sequence of operations of the random access memory 8 is effected under control of the associated data processing system 43. When selected tracks on a selected record member have been identified by the system 43, address information is provided to the file motor drive control 27, and the cylinder 13 is rotated to a selected position. The system 43 also provides control information to the linear positioner 29 and motor 32 for the separator mechanism 23, and activates the engagement arm 34 mechanism when the selected record member is exposed. Concurrently, the linear positioner 41 for the head assembly 39 is controlled, so that selected tracks are utilized, and a drum motor control 44 is activated to operate the drum motor 37 in its controlled cycle. Data transfer between the head assembly 39 and the data processing system 43 is effected through recording and reproducing circuits 45 in conventional fashion. It will be appreciated that the multiple lines which may connect these various elements have been omitted for simplicity.

In this type of system, as previously pointed out, the record member 10 is curved about the axis of the drum 35 during the data transfer operation, as it is rotated past the head assembly 39. During this operation, the curved record member 10 conforms to the drum 35, but remains separated therefrom, because of air films on both sides of the record member 10 as it moves at high speed. The air film on the transducer 39 (magnetic head) side of the record member 10 provides for close non-contact spacing between the heads 40 and the recording and reproduction surface of the record member 10. Very close spacing between the magnetic heads 40 and the record member 10 is highly desired in order to allow high density recording and a high level playback signal.

The curvilinear path imposed on the record member 10 during the data transfer would introduce the previously described anticlastic curvature deviation along the side edges 46 (FIG. 2) of the record member 10, except for the special configuration of the record member 10. Because the central axis about which the record member 10 is curved is on the opposite side from the head assembly, the edges of the record member 10 would, without some form of compensation, tend to curl radially outwardly from the axis of curvature and into contact with the head assembly 39 because of the anticlastic curvature effect, with resulting wear on the side edges of the record member 10 and loss of data therefrom. Such curling is avoided as hereinafter described.

Figure 2:
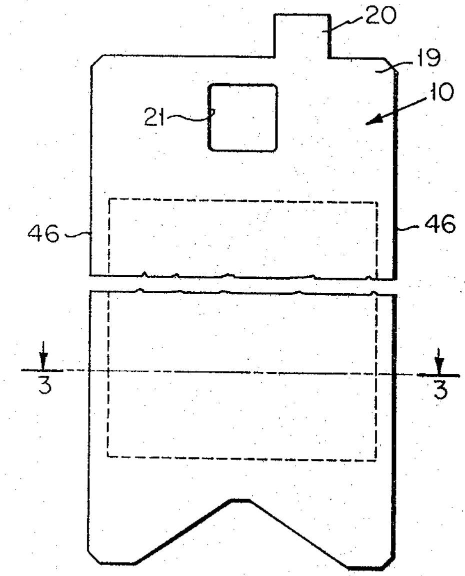
FIG. 2 is a schematic front elevation of a magnetic record member in accordance with the invention.
Figure 3:
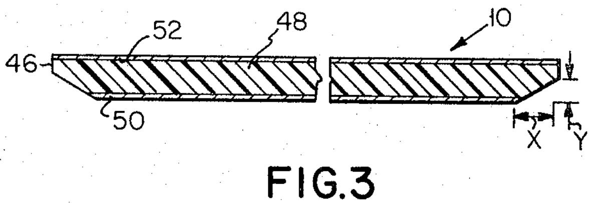
FIG. 3 is an enlarged cross section, taken along the line 3—3 in FIG. 2.
Figure 4:
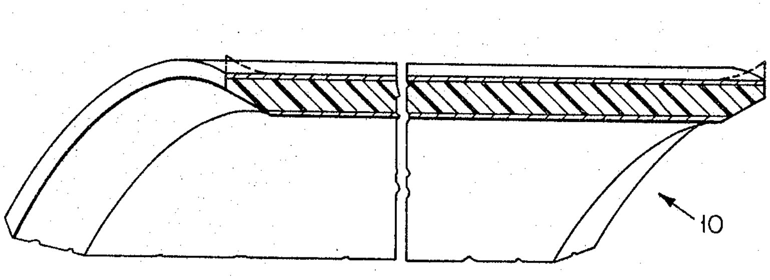
FIG. 4 is an enlarged fragmentary perspective view of a section of a chamfered record member in accordance with the invention, said member moving in a curvilinear path, the anticlastic curvature of an unchamfered record member being illustrated in dotted outline.

A preferred example of a specially configured record member 10 in accordance with the invention is illustrated in FIGS. 2, 3 and 4. As shown in FIG. 3, the member 10 may comprise a flat generally rectangular sheet of approximately 4 inches by 13 inches having a substrate 48 formed of any suitable material such as polyethylene terephthalate, commercially available from E. I. du Pont de Nemours Co., Wilmington, Delaware, under their U.S. registered trademark "Mylar." Preferably the substrate is approximately 0.005 inch thick, although other thicknesses are also suitable. On one surface, which may be referred to as the back surface, the record member has a coating 50 of suitable thickness, for example approximately 0.0001 inch, of an anti-static, anti-friction material such as carbon disposed on and secured to the adjoining substrate 48. The relative proportions of the layers, and the cross section of the members, will be observed to be not in scale in all the figures. On the opposite surface of the record member there is provided a layer 52 of magnetic material such as iron oxide, or nickel-cobalt, or another material suitable for use as the magnetic recording surface, secured to said opposite surface. As best seen in FIG. 2, the upper or leading end of the record member 10 is provided with the indexing tab 20, having one of a plurality of lateral positions, so as to uniquely identify the particular record member within its particular cell 11. Each of the four corners of the record member may be slightly rounded or tapered, as shown in FIG. 2, by cutting in order to facilitate ease of egress and ingress of the record member 10 relative to the cell 11. The record member 10 also preferably includes a specially configured trailing end cut out to provide a dynamically stabilizing swallow tail pattern, as shown in FIG. 2.

A curved body of finite thickness, such as the record member 10 shown in FIG. 4, can be said to have a curvilinear midplane within the volume defined by the body. Considering the radius of curvature of a body which follows a circular arc as a convenient reference, it will be seen that longitudinal segments of such a body which lie at radii greater than the midplane must stretch further than the midplane, and thus undergo tensile strain. Longitudinal segments at radii less than the midplane are under compressive stress, and the disparity in these longitudinal forces leads to the curvature effect.

The anticlastic curvature phenomenon is relatively simply explained in accordance with Poisson's ratio, which states that elastic materials contract or expand laterally when subjected to longitudinal tension or compression, respectively. Above (radially outward from) the midplane defining a neutral tension-compression line for the body, the tensile stresses result in contraction of the body while below the midplane the compression causes lateral expansion of the body. Poisson's ratio may be defined as follows:

$$\mu=\epsilon_x/\epsilon_y$$

or the ratio of lateral strain $\epsilon_x$ over longitudinal strain $\epsilon_y$. The maximum ratio, for a deformable material which remains substantially constantly in volume, such as rubber, is 0.5. For a substrate material such as is ordinarily used for recording purposes (e.g., Mylar) the ratio is approximately 0.4.

If no further constraining forces act on a cylindrically bent record member, a cross section of the member theoretically tends to conform to a circle having the radius $\rho$ and determined by the ratio $$\rho=R/\mu$$

where $\mu$=Poisson's ratio and $R$=the radius of the curvature of the member.

With a relatively thin and wide record member which has coatings on both sides, and which is constrained by air films and other forces, the anticlastic curvature is of significance only in the region of the outer edges, and the majority of the central region follows the midplane.

With practical tape dimensions and bending radii (R) only the tape thickness H and Poisson's ratio are found to be of significance as to the height of the edge curl. As above discussed, there is substantially no curling of the record member in its central region, but as one proceeds laterally toward the side edges of the record member, more deformation occurs, first in a negative (downward) direction toward the central axis of the radius of curvature, R, of the record member, and then in a positive (upward) direction as the side edges of the member are approached and reached. This deformation is illustrated by the solid line A of FIG. 5, which represents positive and negative displacements from the midplane of the record member. Accordingly, the observed deformation is not merely an upwardly "cupping" effect, away from the radius of curvature, but may be a "waviness" which involves both a major positive variation and a lesser but still very troublesome negative variation.

Figure 5:
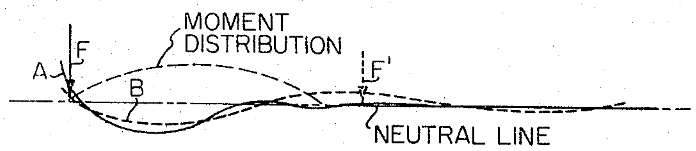
FIG. 5 is a graphical representation of the radial forces and moment distributions generated by arrangements in accordance with the invention, and the physical displacement (not to scale) of a record member subject to curvature.

The solid line curve A of FIG. 5 has been expanded laterally and vertically in order to provide better visualization of the anticlastic curvature effect. Actually, the deviation at the very edge is not visibly discernible, being of the order of 500–1000 microinches in a practical example. This deviation far exceeds the negative deviation in magnitude, and if substantially eliminated results in what may be referred to as an effectively flat strip cross section for most purposes.

Reduction of the thickness of the recording member assists in reducing the severity of edge deformation. However, reduction of the thickness of the recording member may readily introduce other problems, such as reduced durability, excessive pliability and the like, and is often not feasible for other considerations. Although the shape of the magnetic transducers can sometimes be tailored to conform to the edge curl, this expedient is not feasible where lateral movement of the head assembly across the record member is used in order to increase the number of recording tracks.

In accordance with the present invention, however, the undesired side edge curl of the record member is simply and effectively eliminated by controlled modification of the thickness of the record member adjacent the side edges thereof. This modification takes the form of the introduction of a profile having relieved portions. Specifically, the side edges of the record member, relative to the radius of curvature, are chamfered at a slight angle from or adjacent the midline or centerline of the member inwardly and downwardly through the substrate 48 and coating 50, as shown in FIGS. 3 and 4. Removal of a portion of the record member reduces the volume of material which is normally under compression in the region of the side edges. However, the circumferential tensional forces in the remaining side edge portions of the record member are still present. This surplus of circumferential tension results in an inwardly directed radial force component counteracting the anticlastic curvature or curl effect arising because of Poisson's ratio. With proper selection of the chamfer angle, the member remains substantially flat, instead of exhibiting the curl illustrated in dotted outline in FIG. 4. With an appropriately selected chamfer angle for a given sheet of material and curvature, the transverse segment of the sheet remains substantially at the midplane.

In a particular example of an arrangement in accordance with the invention, a chamfer angle relative to the midplane of approximately 1° to 2°, specifically 1° 13′, was utilized. In this regard, the record member was 0.005 inch thick and was chamfered 0.00137 inch up from the bottom of the side edge (hereafter Y direction) in a straight line to a point on the bottom surface of the member 0.0642 inch in from the side edge (hereafter X direction). The X and Y dimensions are shown in FIG. 3. The chamfering was accomplished by exposing both bottom side edges of the record member to the action of a carbide cutting tool. The net result was that the record member 10 remained substantially flat without any appreciable curling when subjected to a 2 inch bending radius in the applicable practical system. The beveled or chamfered portion was smooth and uniform throughout the length of both side edges.

The profiling of the edge of the record member is therefore found to compensate for the edge curl of the record member which results from the anticlastic curvature effect. In practice, 0.005 inch thick record members have been maintained within compliance requirements which are within tens of microinches, so that they can be drawn past a complex magnetic head assembly in a curvilinear path with an extremely close head-to-record member spacing, but without contact between the head and record member and therefore without uneven wear on the record member over a long period of operation.

Referring specifically to FIG. 5, the chamfer acts to introduce an effective force F at the outer edge of the strip, so as to return the edge to the midplane. The reduction in distortion is represented diagrammatically by curve B, but is actually much greater than shown. Workers in the art will appreciate that the X and Y dimensions of the chamfer will vary to a lesser degree dependent upon other factors than given above. In one practical system using record members of this type, the drum construction is not symmetrical as to both edges, and an additional radial outward force is introduced against what may be referred to as the inside edge. For such an application the X dimension was 70 mils on both sides, but Y dimensions of 1.9 mils on the inside edge and 1.7 mils on the outside edge were used to provide minimum deviations and substantial straightness at both edges.

It will be appreciated that other profiles than a linearly beveled or chamfered side edge configuration can be employed for the record member in order to overcome or prevent anticlastic curvature. It is possible, for example, to introduce a side edge profile which has a complex curvature and which thereby compensates in a non-linear fashion for the uneven tensile-compressive force distribution which results from curvature of the record member. However, the problems involved in providing such a complex curvature profile are substantial, and it is preferred to utilize the linearly chamfered edge configuration for most situations. The desired angle of the chamfer will be dependent both upon the thickness of the record member and upon the radius of curvature of the record member in its curvilinear movement, as well as on Poisson's ratio for the particular substrate, and the modifying effects, if any, of the coating on one or both opposite surfaces of the substrate. In this regard, the chamfer angle is directly proportional to the thickness of the record member and Poisson's ratio. For typical applications, a satisfactory angle of chamfer has been determined empirically to be between 0.5° and about 10°, preferably about 1°–1.5° for polyethylene terephthalate films of about 0.005 inch thickness where the proposed radius of curvature for the member is about 2 inches. Similar small angles of chamfer can be used with thin record members on reasonably sized support drums.

As previously discussed, thin strips of uncorrected or rectangular cross section tend to distort in somewhat wavelike fashion because of the anticlastic curvature effect, rather than distorting only at the very edges. Compensation by relief of the profile of the record member as above described reduces deviations to satisfactory levels for all but a few installations and record members. With some systems, depending upon materials, thicknesses, and curvatures, it may be desired to obtain further improvement. When very closely measured following correction by the use of chamfering in accordance with the invention, minor deviations, both positive and negative, may still be found to be present. In the event that head wear, tape wear, or the reproduced signal are so critical that further linearity of the record member is necessary, this may also be accomplished by alternative means in accordance with the invention.

Figure 6:
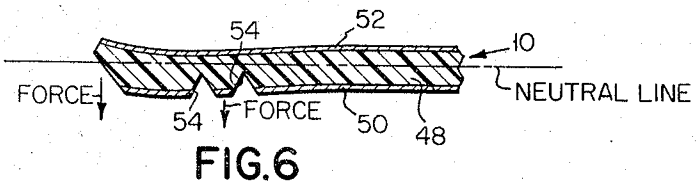
FIG. 6 is a cross-sectional view, not to scale, of yet another record member in accordance with the invention.

One suitable further expedient is shown in the cross-sectional fragmentary view of a record member presented in FIG. 6. Here, the record member 10 is chamfered at each side edge, but additionally includes longitudinal notches or V-shaped grooves 54 disposed inwardly of the edge chamfers. The notches 54 serve to introduce additional force components of a corrective nature. To understand this effect, it should first be appreciated that the generation of the corrective radial force (due to the chamfer) is accompanied by a moment distribution across a longitudinal segment along the edge of the member, as shown in FIG. 5. This moment distribution is greatest at a point inward of the chamfer. Thus the erstwhile positive deviation at the very edge may be reduced to a minimum by the chamfer, but a greater positive deviation may be introduced at the next positive-going wave or deviation. The longitudinal notches 54 introduce additional radial forces F′ which oppose the positive deviation at the most effective point. The deviations of FIG. 6 have again been greatly exaggerated in order to show the effect and its correction. The result is even greater uniformity and linearity of the record member 10.

The anticlastic curvature problem connected with radially curved record members could be overcome by arrangements much more complex than those provided in accordance with the present invention. Thus, stiffening members or compensating side edge members could be added to or incorporated in the record members. But these solutions are more expensive, time consuming and complicated and do not afford the ease of control obtained by chamfering. The solution of the complex problems of anticlastic curvature by chamfering or otherwise contouring the side edges of the record members in accordance with the foregoing is therefore advantageous from the cost standpoint as well.

While the invention has been particularly shown and described with reference to preferred embodiments thereof, it will be understood by those skilled in the art that various changes in form and details may be made therein without departing from the spirit and scope of the invention.

What is claimed is:

1. An improved record member for a random access memory, said member comprising a web having a substrate and a recording layer disposed on and adhering to one surface of said substrate, said substrate having a relieved profile of diminishing cross-sectional area on the surface opposite that carrying said record coating in the side edges, whereby the volume of said substrate in that area is reduced sufficiently to reduce compressive stress in said substrate and substantially eliminate anticlastic curvature of said web during movement of the web in a selected curvilinear path.

2. An improved sheet record member for a random access memory which moves the record member in a curved path, such as to introduce anticlastic curvature at the side edges, the record member including means on the concave side of said record relative to the curved path defining a compressive stress reducing profile having relieved portions providing a diminished cross-sectional area in the side edges.

3. An improved sheet record member for a data memory system which moves the record member in a curved path about a selected axis of curvature, such that anticlastic curvature is introduced in the side edge, the record member being characterized by compressive stress reducing profiles including longitudinal relieved portions on the side facing the axis of curvature, said relieved portions being substantially parallel to the side edges and diminishing the cross-sectional area in the vicinity of said edges.

4. An improved magnetic record member for a random access memory, said member comprising a web having substantially parallel side edges, said web comprising a substrate and a recording layer disposed on and adhering to one surface of said substrate, the side edges of said substrate being chamfered on the surface opposite that having said record coating, whereby the volume of said substrate in that area is sufficiently reduced to substantially eliminate anticlastic curvature deviation of said side edges during movement of said web in a selected curvilinear path.

5. A magnetic record member for a random access memory, said member comprising a flat web of material comprising a flexible substrate, an anti-static coating disposed on and adherent to a first surface of said substrate, and a magnetic coating disposed on and adherent to the opposite surface of said substrate, said web having parallel side edges chamfered with respect to said first surface, the chamfer angle relative to the plane of said web being sufficient to substantially eliminate anticlastic curvature deviations of the edges of said web during movement of said web in a selected curvilinear path.

6. The magnetic record member of claim 5 wherein said chamfer angle is between about 0.5° and 10° and extends through both said anti-static coating and a portion of said substrate adjacent both side edges of said web.

7. An improved magnetic record member for a random access memory comprising a flat thin sheet of extended surface area having parallel side edges and including a substrate formed of flexible polyethylene terephthalate plastic, a carbon anti-static coating disposed on and adhering to a first surface of said substrate and a magnetic coating disposed on and adhering to a second surface of said substrate opposite said first surface, said substrate comprising the major part of the volume of said sheet, said side edges being chamfered through a portion of said substrate and through said carbon coating at an angle sufficient to substantially eliminate deviation of the side edges of the sheet from the plane of the sheet due to anticlastic curvature of said sheet during a selected radial curvature of said sheet.

8. The improved magnetic record member of claim 7 wherein said chamfer angle is between about 0.5° and about 10°.

9. An improved magnetic record member for a random access memory, said member comprising a thin flat flexible sheet of extended surface area and substantially parallel side edges, said sheet comprising a substrate of polyethylene terephthalate plastic of about 0.005 inch thickness, a carbon anti-static coating of about 0.0001 inch thickness disposed on and adhering to one surface of said substrate and a magnetic coating of about 0.0001 inch thickness disposed on and adhering to the surface of said substrate opposite the surface to which said anti-static coating is attached, each of said side edges being smoothly chamfered throughout the length thereof and through a portion of said substrate and through said anti-static coating at a chamfer angle of between about 1° and 1.5° whereby anticlastic curvature of said sheet is substantially eliminated during curvature of said sheet through a radius of about 2 inches.

10. An improved magnetic record member for a random access memory, said memory comprising a web having a substantially rectangular form with parallel side edges tapered at each end thereof, the web member having index tabs at a leading edge and an internal aperture adjacent the leading edge defining means for advancing the web member, said web comprising a polyethylene terephthalate substrate about 0.005 inch thick, a carbon anti-static coating approximately 0.0001 inch thick disposed on and adhering to a first surface of said web, and a magnetic coating approximately 0.0001 inch thick disposed on and adhering to a surface of said web opposite that to which said anti-static coating is attached, the side edges of said web being chamfered along essentially the entire length thereof through a portion of said substrate and through said anti-static coating at a chamfer angle relative to the plane of the web member of between about 1° and about 1.5°, whereby said web can be bent in a radius of curvature of about 2 inches without exhibiting substantial anticlastic curvature.

11. The invention as set forth in claim 10, above, but including further means defining a pair of V-shaped notches disposed adjacent each chamfered side edge and parallel thereto, through said anti-static coating.

12. An improved sheet record member for a random access memory which moves the record member in a curved path, such as to introduce anticlastic curvature at the side edges, the record member including longitudinal notches on the inner curved side substantially parallel to the side edges.

13. An improved sheet record member for a random access memory which moves the record member in a curved path, such as to introduce anticlastic curvature distortion at the side edges, characterized by at least one longitudinal notch parallel to each such side edge on the concave side of the record member.

14. An improved magnetic record member for a random access memory comprising a flat thin sheet of extended surface area and having parallel side edges and including a substrate formed of flexible plastic, a carbon anti-static coating disposed on and adhering to a first flat side of said substrate and a magnetic coating disposed on and adhering to the second flat side of said substrate, said substrate comprising the major part of the volume of said sheet, said side edges being chamfered through a portion of said substrate and through said carbon coating at an angle relative to the plane of the second flat side which substantially eliminates outward deviation of the side edges of said sheet from the plane of the sheet due to anticlastic curvature of said sheet during a selected radial curvature of said sheet, and said second surfaces further including a pair of longitudinal notches parallel to said side edges to substantially eliminate outward deviations of internal portions of said sheet.

References Cited by the Examiner

UNITED STATES PATENTS

| | | | |
|---|---|---|---|
| 1,588,706 | 6/1926 | Cothran | 179—100.2 |
| 1,950,518 | 3/1934 | Read | 179—100.2 |

References Cited by the Applicant

UNITED STATES PATENTS

| | | |
|---|---|---|
| 3,109,924 | 11/1963 | Frederick. |
| 3,116,159 | 12/1963 | Fisher et al. |

FOREIGN PATENTS

| | | |
|---|---|---|
| 889,788 | 2/1962 | Great Britain. |

BERNARD KONICK, *Primary Examiner.*

T. W. FEARS, *Assistant Examiner.*